US008600760B2

(12) United States Patent
Grost et al.

(10) Patent No.: US 8,600,760 B2
(45) Date of Patent: Dec. 3, 2013

(54) CORRECTING SUBSTITUTION ERRORS DURING AUTOMATIC SPEECH RECOGNITION BY ACCEPTING A SECOND BEST WHEN FIRST BEST IS CONFUSABLE

(75) Inventors: Timothy J. Grost, Clarkston, MI (US); Rathinavelu Chengalvarayan, Naperville, IL (US); Jason W. Clark, Grosse Pointe Woods, MI (US); Edward Abeska, Ferndale, MI (US)

(73) Assignees: General Motors LLC, Detroit, MI (US); GM Global Technology Operations LLC, Detroit, MI (US)

( * ) Notice: Subject to any disclaimer, the term of this patent is extended or adjusted under 35 U.S.C. 154(b) by 1351 days.

(21) Appl. No.: 11/563,835

(22) Filed: Nov. 28, 2006

(65) Prior Publication Data

US 2008/0126100 A1 May 29, 2008

(51) Int. Cl.
*G10L 21/00* (2013.01)
*G10L 15/26* (2006.01)
*G10L 15/08* (2006.01)
*G10L 15/20* (2006.01)

(52) U.S. Cl.
CPC .............. *G10L 15/265* (2013.01); *G10L 15/08* (2013.01); *G10L 15/20* (2013.01)
USPC ............................ 704/275; 704/251; 704/240

(58) Field of Classification Search
CPC ........ G10L 15/265; G10L 15/08; G10L 15/20
USPC ....................................................... 704/240
See application file for complete search history.

(56) References Cited

U.S. PATENT DOCUMENTS

| 7,103,543 | B2 * | 9/2006 | Hernandez-Abrego et al. ............... 704/240 |
| 7,421,387 | B2 * | 9/2008 | Godden ......................... 704/200 |
| 7,437,297 | B2 * | 10/2008 | Chaar et al. .................... 704/275 |
| 2006/0069560 | A1 * | 3/2006 | Passaretti et al. ............. 704/251 |
| 2006/0253793 | A1 * | 11/2006 | Zhai et al. ...................... 715/773 |
| 2007/0239445 | A1 * | 10/2007 | Kobal et al. ................... 704/235 |
| 2008/0046250 | A1 * | 2/2008 | Agapi et al. ................... 704/275 |

* cited by examiner

*Primary Examiner* — Talivaldis Ivars Smits
*Assistant Examiner* — Farzad Kazeminezhad
(74) *Attorney, Agent, or Firm* — Anthony Luke Simon; Reising Ethington P.C.

(57) ABSTRACT

A speech recognition method includes the steps of receiving input speech containing vocabulary, processing the input speech with a grammar to obtain N-best hypotheses and associated parameter values, and determining whether a first-best hypothesis of the N-best hypotheses is confusable with any vocabulary within the grammar. The first-best hypothesis is accepted as recognized speech corresponding to the received input speech if the first-best hypothesis is not determined to be confusable with any vocabulary within the grammar. Where the first-best hypothesis is determined to be confusable, at least one parameter value of the first-best hypothesis can be compared to at least one threshold value, and accepting the second-best as the recognized speech, if its confidence score is within certain lower and upper threshold values and is not confusable with the first-best. The first-best hypothesis can be accepted as recognized speech corresponding to the received input speech, if the parameter value of the first-best hypothesis is greater than the threshold value.

12 Claims, 3 Drawing Sheets

CORRECTING SUBSTITUTION ERRORS DURING AUTOMATIC SPEECH RECOGNITION BY ACCEPTING A SECOND BEST WHEN FIRST BEST IS CONFUSABLE

TECHNICAL FIELD

This invention relates to automatic speech recognition (ASR) and, more particularly, to ASR error correction.

BACKGROUND OF THE INVENTION

ASR technologies enable microphone-equipped computing devices to interpret speech and thereby provide an alternative to conventional human-to-computer input devices such as keyboards or keypads. Many telecommunications devices are equipped with ASR technology to detect the presence of discrete speech such as a spoken nametag or control vocabulary like numerals, keywords, or commands. For example, ASR can match a spoken command word with a corresponding command stored in memory of the telecommunication device to carry out some action, like dialing a telephone number. Also, an ASR system is typically programmed with predefined acceptable vocabulary that the system expects to hear from a user at any given time, known as in-vocabulary speech. For example, during a voice dialing mode, the ASR system may expect to hear keypad vocabulary such as "Zero" through "Nine," "Pound," and "Star," as well as ubiquitous command vocabulary such as "Help," "Cancel," and "Goodbye."

One problem encountered with voice dialing, and speech recognition generally, is that ASR systems sometimes misrecognize a user's intended input speech. Such ASR misrecognition includes rejection, insertion, and substitution errors. A rejection error occurs when the ASR system fails to interpret a user's intended input utterance. An insertion error occurs when the ASR system interprets unintentional input, such as background noise or a user cough, as an intended user input utterance. A substitution error occurs when the ASR system mistakenly interprets a user's intended input utterance for a different input utterance.

More particularly, a substitution error is usually due to confusability between similar sounding words. For example, a substitution error sometimes occurs where the keypad word Pound, is misinterpreted as the command word Help. As a result, the ASR system may process the incorrect word, or may repetitively ask the user to repeat the command. In either case, the user can become frustrated.

One solution to this problem is to allow a user to indicate to the ASR system, after the fact, that the user's utterance was misrecognized. Thereafter, the ASR system presents the user with a list of recently received words and allows the user to select those words that were misrecognized. Then, the selected words are input to a speech training process, which modifies acoustic models to improve future recognition accuracy.

Another solution to this problem is to allow a user to train an out-of-vocabulary word into an in-vocabulary lexicon using a keyboard and a microphone. The system converts the text of the word and the user's pronunciation of the word into a phonetic description to be added to the lexicon. Initially, two possible phonetic descriptions are generated; one is formed from the text of the word using a letter-to-speech system, and the other is formed by decoding a speech signal representing the user's pronunciation of the word. Both phonetic descriptions are scored based on their correspondence to the user's pronunciation, and the phonetic description with the highest score is then selected for entry into the lexicon.

There are several drawbacks to the above-mentioned solutions. They involve time-consuming user feedback loops or user-initiated word training. Also, they may be particularly distracting to a user who is driving a vehicle. And, although these solutions may increase recognition performance of future utterances, they do not improve recognition performance of a current utterance. Accordingly, the ASR system may time out and impair a current communication session. Thus, a better method is needed for reducing confusability between similar sounding words to improve recognition performance of a current utterance.

SUMMARY OF THE INVENTION

According to one aspect of the present invention, there is provided a speech recognition method comprising the following steps:
(a) receiving input speech containing vocabulary;
(b) processing the input speech with a grammar to obtain N-best hypotheses and associated parameter values;
(c) determining whether a first-best hypothesis of the N-best hypotheses is confusable with any vocabulary within the grammar; and
(d) accepting the first-best hypothesis as recognized speech corresponding to the received input speech, if the first-best hypothesis is not determined to be confusable with any vocabulary within the grammar.

The speech recognition method may also include either or both of the following additional steps:
(e) comparing at least one parameter value of the first-best hypothesis to at least one threshold value in situations where the first-best hypothesis is determined to be confusable with any vocabulary within the grammar; and
(f) accepting the first-best hypothesis as recognized speech corresponding to the received input speech when the at least one parameter value of the first-best hypothesis is greater than the at least one threshold value.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
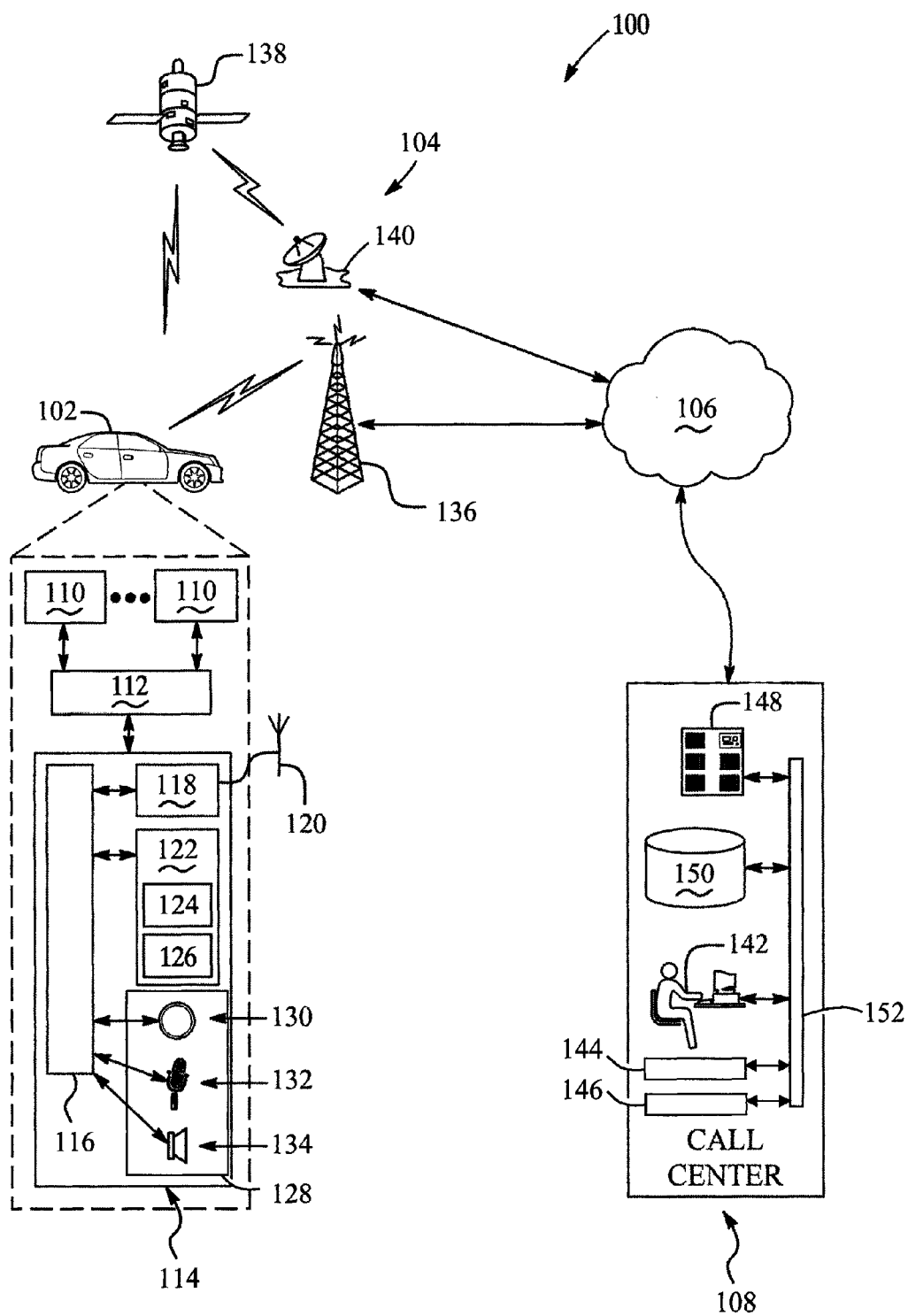
FIG. 1 is a block diagram depicting an example of a telematics system that can be used to implement exemplary methods of correcting speech recognition substitution errors.

An exemplary operating environment is illustrated in FIG. 1, and can be used to implement a presently disclosed method of automatic speech recognition wherein substitution errors are corrected. The method can be carried out using any suitable telematics system and, preferably, is carried out in conjunction with a vehicle telematics system such as system 100.

Those skilled in the art will appreciate that the overall architecture, setup, operation, and individual components of the system 100 are generally known in the art. Thus, the following system description simply provides a brief overview of one such exemplary telematics system, but other systems and components not shown here could also support the presently disclosed method.

The exemplary telematics system 100 includes a vehicle 102 for carrying one or more occupants or users, and a wireless communication system 104 for providing wireless communication to and from the vehicle 102. Also, the system 100 can include a second communications system 106 for communicating the wireless communication system 104 with a call center 108 of the system 100 that provides services to the vehicle 102.

The system 100 can generally facilitate one or more suitable services for vehicle occupants such as vehicle navigation, turn-by-turn driving directions, infotainment, emergency services, vehicle diagnostics, vehicle system updates, and hands-free telephony and vehicle interaction using automatic speech recognition. For this purpose, the system 100 processes data and instructions as well as facilitates wireless voice and data transfer between hardware located on the vehicle 102 and hardware in the remote call center 108. For example, the system 100 enables vehicle occupants to initiate voice communication with the call center 108 or the service center 111.

Vehicle

The vehicle 102 is depicted in the illustrated embodiment as a passenger car, and it will be appreciated that any other vehicles including motorcycles, marine vessels, aircraft, recreational vehicles, and other automobiles such as vans, trucks, or the like, can be used without departing from the scope of the invention. Various electronic modules can be located on the vehicle 102 and include one or more vehicle system modules (VSMs) 110, an on-board vehicle communication bus 112, and one or more vehicle telematics units 114 connected by the bus 112 to the VSMs 110.

The VSMs 110 facilitate any suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent any software, electronic, or electromechanical subsystems, and related sensors or other components throughout the vehicle with which the telematics unit 114 interacts. In a specific example, if the call center 108 sends a signal to the vehicle 102 to unlock the vehicle doors, then the telematics unit 114 instructs an electromechanical door lock VSM to unlock the doors.

The vehicle communication bus 112 facilitates interactions among various vehicle systems, such as the VSMs 110 and/or the telematics unit 114, and uses any suitable network communication configuration whether wired or wireless. Suitable interfaces can be interposed between the bus 112 and the various vehicle systems. As used herein, the term interface broadly means any suitable form of electronic device or adapter, or even a software module or adapter, to enable one piece of equipment to communicate with or control another piece of equipment. A few examples of buses include a Controller Area Network (CAN), Media Oriented System Transport (MOST), Local Interconnect Network (LIN), Ethernet (10baseT, 100baseT), Local Area Network (LAN), a wireless area network (WAN), and/or any suitable International Standard Organization (ISO) or Society of Automotive Engineers (SAE) communication standards.

The vehicle telematics unit 114 facilitates communication and other services between the vehicle 102 or occupants thereof, and various remote locations including the call center 108. The telematics unit 114 interfaces with the various VSMs 110 via the vehicle communication bus 112. The telematics unit 114 can be implemented in any suitable configuration, but can include a processor 116, a communications device 118 for wireless communication to and from the vehicle 102 via one or more antennas 120, a memory 122 to store computer programs 124 and/or one or more databases 126, and a user interface 128. The telematics unit 114 also includes any suitable interface(s) for intercommunicating the aforementioned devices.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSMs 110 are shown separate from the telematics unit 114, it is possible for any combination of these VSMs 110 to be integrated within the telematics unit 114. Furthermore, the telematics unit 114 could include additional components not shown, or could omit some of the components shown.

The telematics processor 116 is implemented in any of various ways known to those skilled in the art such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices and/or modules (not shown) such as a real time clock device to provide accurate date and time information, and/or a timer module to track time intervals.

The processor 116 executes the one or more programs 124 stored in memory 122 to carry out various functions such as system monitoring, data processing, and communicating the telematics unit 114 with the VSMs 110, vehicle occupants, and remote locations. For example, the processor 116 can execute one or more control programs and processes programs and/or data to enable a method of automatic speech recognition, either alone or in conjunction with the call center 108. In another example, the processor 116 controls, generates, and accepts signals transmitted between the telematics unit 114 and call center 108, and between the telematics unit 114 and the vehicle communication bus 112 that is connected to the various VSMs 110. In one mode, these signals are used to activate programming and operation modes of the VSMs 110.

The telematics memory 122 can be any electronic storage device that provides computer-readable storage of data and programs for use by the processor 116. The memory 122 can include volatile, and/or non-volatile memory storage such as RAM, NVRAM, hard disks, flash memory, and/or the like, and can be implemented as one or more separate physical devices. The programs 124 include one or more computer programs that are executed as instructions by the processor 116 to carry out various functions of the telematics unit 114 such as messaging, diagnostics, communication, speech recognition, and/or the like. For example, the programs 124 resident in the memory 122 and executed by the processor 116 can be used to enable a method of automatic speech recognition. The database 126 can be used to store message data, diagnostic trouble code data or other diagnostic data, vehicle data upload (VDU) records, event activation tables, speech recognition data, and/or the like. The database 126 can be implemented as database tables that enable lookups to be performed on data stored in the database 126, and this can be done using known indexing techniques, database queries, straight serial searching through such tables, and/or any other suitable storage and lookup techniques.

The telematics communications device 118 and associated antenna 120 transmits and receives voice and data to and from the wireless communication system 104 so that the telematics unit 114 can communicate with the call center 108 such as via the second communication system 106. The communications device 118 provides such wireless communication via cellular, satellite, and/or other wireless path, and can facilitate voice and/or data communication, wherein both voice and data signals can be sent and received over a voice channel and/or vice-versa. Those skilled in the art will recognize that the communications device 118 can transmit and receive data over a voice channel by applying any suitable type of encoding or modulation to convert digital data for communication through a vocoder or speech codec incorporated in a cellular chipset. Any suitable encoding or modulation technique that provides an acceptable data rate and bit error rate can be used. The communications device 118 can include any other suitable modules as discussed below.

The communications device 118 can include a telephony module including communications software and hardware such as a wireless modem and/or a mobile telephone. The mobile telephone can be any suitable wireless telephony device such as a mobile telephone, which can be analog, digital, dual mode, dual band, multi-mode, and/or multi-band. The mobile telephone can include a separate processor and memory, and/or a standard cellular chipset. Moreover, the mobile telephone can use any suitable cellular technology such as Advanced Mobile Phone System (AMPS), code division multiple access (CDMA), time division multiple access (TDMA), Global System for Mobile communications (GSM), or the like, but could also utilize proprietary or other wireless technologies to communicate with the wireless communication system 104. Although shown as a separate component, communication device 118, or portions thereof, can be implemented through software using microprocessor 116; for example, a modem used for wireless cellular communication can be implemented in this manner.

The telematics user interface 128 includes one or more input and output interfaces to receive input from, and transmit output to, telematics users. As used herein, the term user includes telematics service subscribers, vehicle occupants including drivers and passengers, and the like. Also, as used herein, the term user interface broadly means any suitable form of electronic device or adapter, or even a software module or adapter, which enables vehicle occupants to communicate with or control another piece of equipment. The user interface 128 can include individual components distributed throughout the vehicle, and/or can be integrated as a single unit such as a human/machine interface (HMI), multi-media center, or the like. Multi-media centers can receive and store downloads of content such as music, webpages, movies, television programs, videogames, or the like, for current or delayed playback.

The input interfaces can include one or more tactile devices 130, one or more microphones 132, or any other types of input technology. First, the tactile input device 130 enables vehicle occupants to activate one or more functions of the telematics unit 114, and can include one or more pushbutton switches, keypads, keyboards, or other suitable input devices located within the vehicle 102 in reach of the vehicle occupants. For example, the tactile input device 130 can be used to initiate telecommunications with remote locations such as the call center 108 or mobile telephones and/or to initiate vehicle updates, diagnostics, or the like. Second, the microphone 132 allows vehicle occupants to provide vocal input to the telematics unit 114, and enables vocal communication with various remote locations via the communications device 118. Vocal input from vehicle occupants can be interpreted using a suitable analog-to-digital interface and/or digital signal processor such as a sound card (not shown) between the microphone 132 and the processor 116, and voice and speech recognition programs and data stored within the memory 122.

The output interfaces can include one or more speakers 134, a visual display device such as a liquid crystal display, plasma screen, touch screen, heads-up display, or the like (not shown), or any other types of visual output technology. The speakers 134 enable the telematics unit 114 to communicate audible speech, signals, audio files, or the like to vehicle passengers, and can be part of a vehicle audio system or stand-alone components specifically dedicated for use with the telematics unit 114. A suitable interface such as a sound card (not shown) can be interposed between the speakers 134 and the telematics processor 116.

Communication System(s)

The communication systems 104, 106 can be implemented separately or can be combined as an integral system. Also, with suitable equipment, the call center 108 can be wirelessly communicated directly to the wireless communication system 104 without the second system 106.

The wireless communication system 104 can include one or more analog and/or digital cellular networks 136, a wireless computer network such as a wide area network (WAN), wireless local area network (WLAN), broadband wireless area (BWA) network, and/or any other suitable wireless network used to transmit voice and/or data signals between the vehicle 102 and various remote locations such as the call center 108. The exemplary cellular network 136 can be implemented as a CDMA, GSM, or other cellular communication network that enables exchange of voice and data between the vehicle 102 and the second communication system 106. The network 136 can include any suitable combination of cell towers, base stations, and/or mobile switching centers (MSC). For instance, a base station and cell tower could be co-located at the same site or they could be remotely located from one another, each base station could service a single cell tower or multiple cell towers, and various base stations could be coupled to a single MSC, to name but a few of the possible arrangements. A speech codec or vocoder can be incorporated in the system 104, such as in one or more of the base stations, but depending on the particular architecture of the wireless network, it could be incorporated within an MSC or some other network component as well.

The system 104 can also or alternatively carry out wireless communication by satellite transmission using one or more satellites 138 to communicate the vehicle 102 with the call center 108 via a ground-based satellite transceiver 140. As an exemplary implementation, the satellite transceiver 140 and satellite(s) 138 can transmit radio signals to the vehicle 102. For example, a satellite transmission can be broadcast over a spectrum in the "S" band that has been allocated by the U.S. Federal Communication Commission for national broadcasting of satellite-based Digital Audio Radio Service (DARS).

More specifically, satellite transmission can be carried out using XM™ brand satellite radio services.

The second communication system 106 can be a land-based wired system such as a public switched telephone network (PTSN), Internet Protocol (IP) network, optical network, fiber network, cable network, and/or utility power transmission lines. The system 106 can also be another wireless communication system like system 104, WAN, WLAN, or a BWA network, or any combination of the aforementioned examples, any of which can be used or adapted for voice and/or data communication.

Call Center

The call center 108 provides services to the vehicle 102 by processing and storing data, and communicating with the vehicle 102. The call center 108 can provide back-end functions to the vehicle telematics unit 114 and can include one or more fixed or mobile data centers in one or more locations. The call center 108 can include advisors 142 to monitor various vehicle conditions, respond to service requests, and provide vehicle services such as remote vehicle assistance in connection with in-vehicle safety and security systems. The advisors 142 can be implemented as live human advisors, or as automatons or computer programs responsive to user requests.

The call center 108 includes one or more voice and/or data interfaces 144 such as wired or wireless modems, switches such as private branch exchange (PBX) switches, and/or routers. The interface(s) 144 transmit and receive voice and/or data signals, such as by vehicle data uploads (VDUs), between the vehicle telematics unit 114 and the call center 108 through one or both of the communications systems 104, 106. For data-over-voice communication, the interface(s) 144 preferably apply some type of encoding or modulation to convert digital data for communication with a vocoder or speech codec.

The call center 108 can further include one or more communication service managers 146, one or more servers 148 to process data, one or more suitable databases 150 to store user data such as subscriber profiles and authentication data, and any other suitable data. The call center 108 can also include one or more wired and/or wireless networks 152 such as a LAN or WLAN, for connecting the call center components together along with the any computer(s) used by the one or more advisors 142. For example, the servers 148 and databases 150 execute and store one or more control programs and data to enable a method of automatic speech recognition, either alone or in conjunction with the telematics unit 114 of the vehicle 102. In other words, the presently disclosed method can be enabled by the telematics unit 114 of the vehicle 102, by the computing equipment and/or personnel in the call center 108, or by any combination thereof.

ASR System

In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

Figure 2:
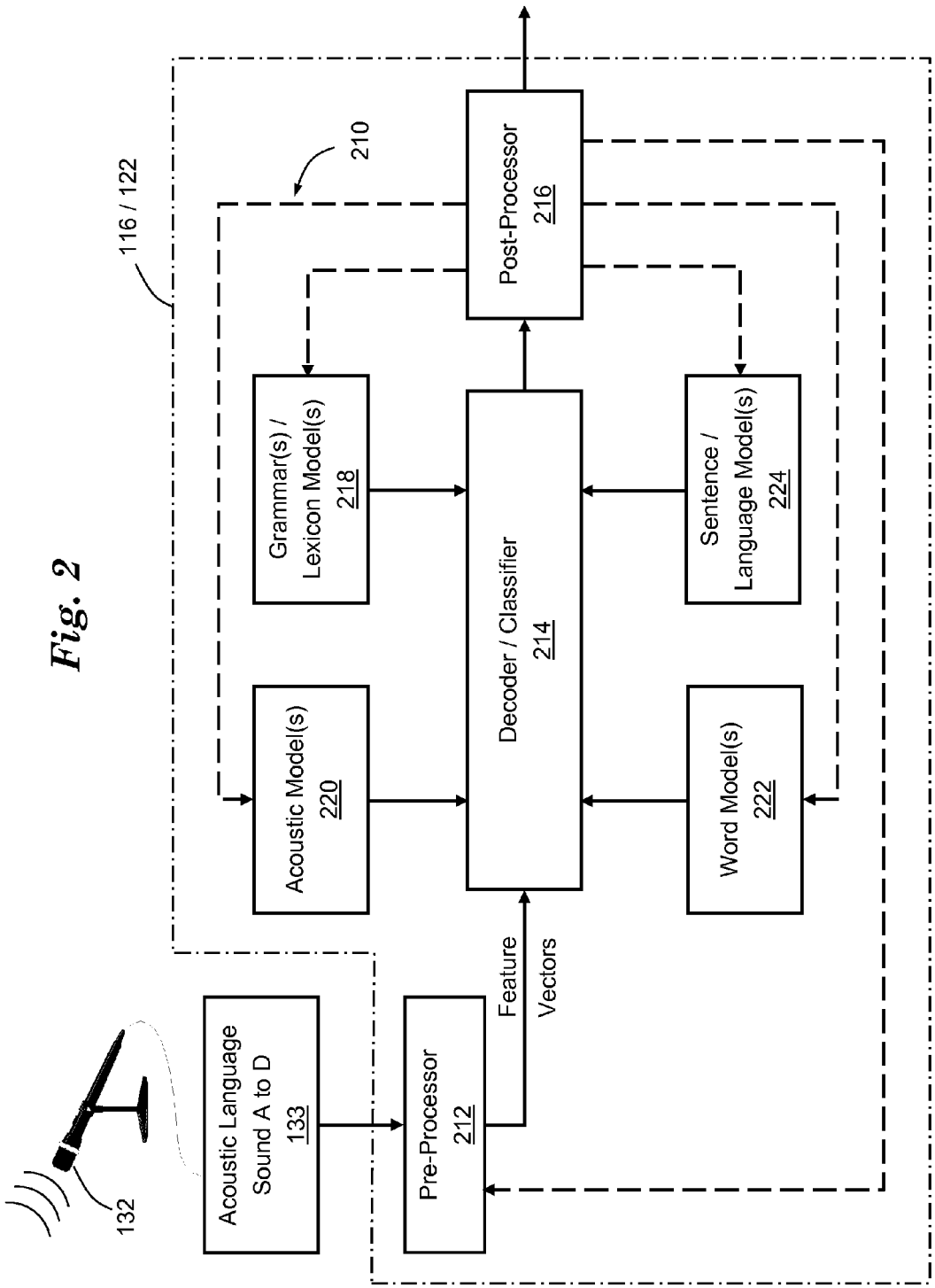
FIG. 2 is a block diagram illustrating an example ASR architecture that can be embedded within the telematics system of FIG. 1 and used to implement exemplary methods of correcting speech recognition substitution errors.

ASR systems are generally known to those skilled in the art, and FIG. 2 illustrates a specific exemplary architecture for an ASR system 210 that can be used to enable the presently disclosed method. The system 210 includes a device to receive speech such as the telematics microphone 132, and an acoustic interface 133 such as the telematics sound card to digitize the speech into acoustic data. The system 210 also includes a memory such as the telematics memory 122 for storing the acoustic data and storing speech recognition software and databases, and a processor such as the telematics processor 116 to process the acoustic data. The processor functions with the memory and in conjunction with the following modules: a front-end processor or pre-processor software module 212 for parsing streams of the acoustic data of the speech into parametric representations such as acoustic features; a decoder software module 214 for decoding the acoustic features to yield digital subword or word output data corresponding to the input speech utterances; and a post-processor software module 216 for using the output data from the decoder module 214 for any suitable purpose.

One or more modules or models can be used as input to the decoder module 214. First, grammar and/or lexicon model(s) 218 can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module 212. Third, word model(s) 222 and sentence/language model(s) 224 provide rules, syntax, and/or semantics to determine which subwords and words can logically follow other sub-words and words to form valid words and sentences. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 102 such as the call center 108. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software can be processed using processors of one of the servers 148 in the call center 108. In other words, the ASR system 210 can be resident in the telematics system 114 or distributed across the call center 108 and the vehicle 102 in any desired manner.

First, acoustic data is extracted from human speech wherein a vehicle occupant speaks into the microphone 132, which converts the utterances into electrical signals and communicates such signals to the acoustic interface 133. A sound-responsive element in the microphone 132 captures the occupant's speech utterances as variations in air pressure and converts the utterances into corresponding variations of analog electrical signals such as direct current or voltage. The acoustic interface 133 converts the analog signals into digital electronic signals. For example, the acoustic interface 133 can receive the analog electrical signals, which can be sampled such that values of the analog signal are captured at discrete instants of time, and then can be quantized such that the amplitudes of the analog signals are converted at each sampling instant into a continuous stream of digital speech data. The digital data are binary bits which are buffered in the telematics memory 122 and then processed by the telematics processor 116 or can be processed as they are initially received by the processor 116 in real-time.

Second, the pre-processor module 212 transforms the continuous stream of digital speech data into discrete sequences of acoustic parameters. More specifically, the processor 116 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMMs for a sequence of subwords can be concatenated to establish word HMMs.

The speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of a word or subword and can be based on particular speakers, speaking styles, and audible environmental conditions. The reference patterns can be generated by suitable reference pattern training of the ASR system and stored in memory, and can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212.

Method of Correcting Substitution Errors

A method of correcting substitution errors during automatic speech recognition is provided herein and can be carried out as one or more computer programs using the architecture of the ASR system 210 within the operating environment of the telematics system 100 described above. Those skilled in the art will also recognize that the method can be carried out using other ASR systems within other operating environments.

Figure 3:
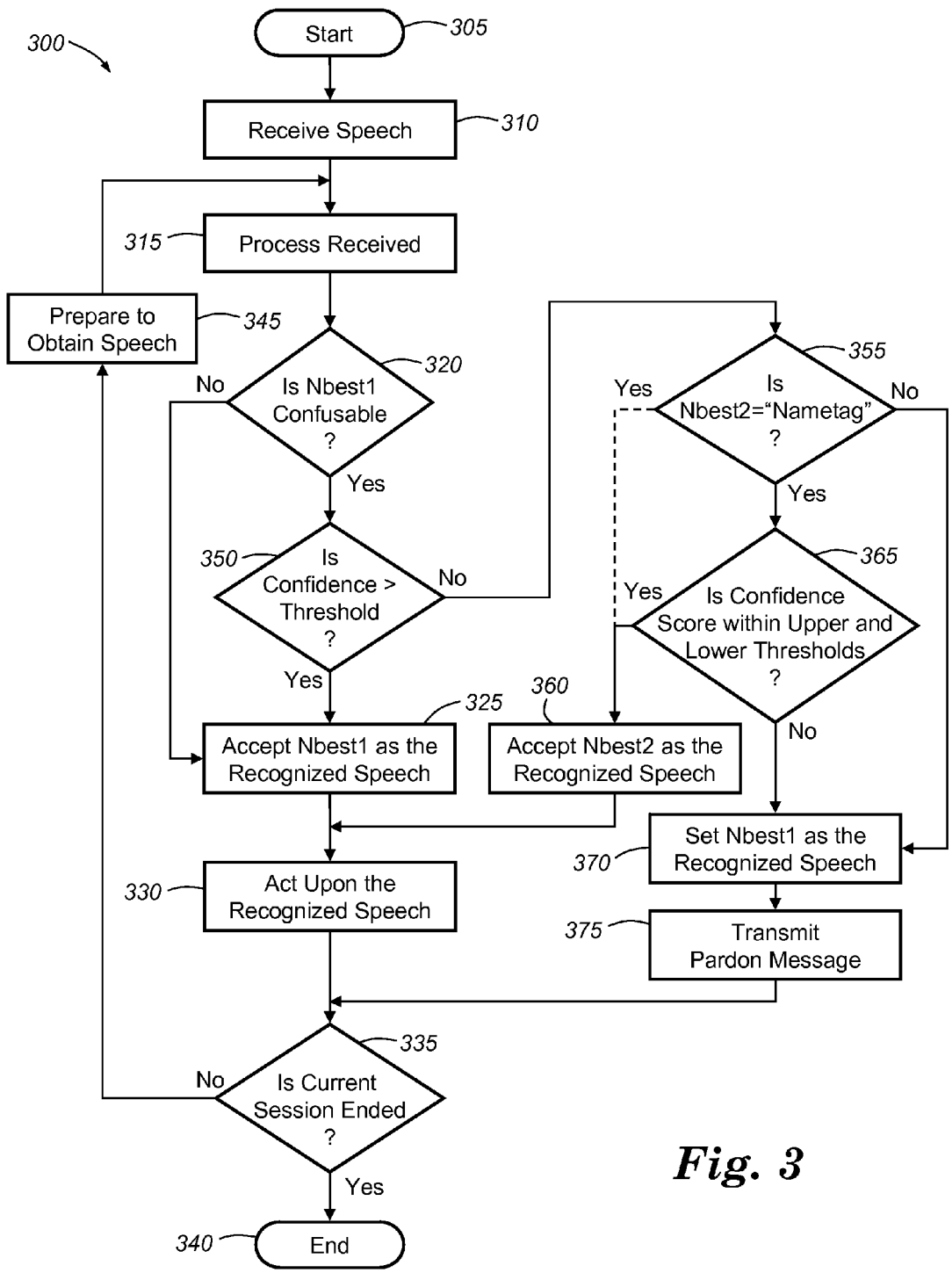
FIG. 3 is a flow chart of an embodiment of exemplary methods of correcting speech recognition substitution errors, which methods can be carried out using the telematics system and ASR architecture of FIGS. 1 and 2.

The method is provided to improve performance of a current speech recognition session by correcting substitution errors during the current session. In general, input speech is received from a user and processed with a grammar to obtain N-best hypotheses and associated parameter values. If a first-best hypothesis is not confusable with any vocabulary within the grammar, then the first-best hypothesis is accepted as recognized speech corresponding to the received input speech. Otherwise, a parameter value of the first-best hypothesis is compared to one or more threshold values and the first-best hypothesis is accepted as the recognized speech if the parameter value of the first-best hypothesis is greater than the threshold value(s). But if not, then a second-best hypothesis is evaluated to determine which of the N-best hypotheses will be selected as the recognized speech. Accordingly, speech recognition performance may be increased by such an improvement in substitution error correction because the method is carried out in real-time during a current ASR session. Thus, users can maintain a current communication session, such as a voicemail communication session, with fewer interruptions of less time, fewer timeouts, and fewer false acceptances of out-of-vocabulary words. FIG. 3 illustrates an exemplary method of substitution error correction, as discussed in detail below.

At step 305, the method 300 is started in any suitable fashion. For example, a vehicle user starts interaction with the user interface of the telematics unit 114, preferably by depressing the user interface pushbutton 130 to begin a session in which the user inputs voice commands that are interpreted by the telematics unit 114 while operating in speech recognition mode. Using the speaker 134, the telematics unit 114 can acknowledge the pushbutton activation by playing a sound or providing a verbal request for a command from the user or occupant.

At step 310, input speech containing vocabulary is received from a user in any suitable manner. For example, the input speech can be received by the microphone 132, converter 133, and processor 116 and/or memory 122 of the ASR system 210.

At step 315, received input speech is processed with a grammar to obtain N-best hypotheses and associated parameter values. For example, the input speech of step 310 can be decoded by the decoder 214 of the ASR system 210 using the grammar 218 and using one or more acoustic models 220. More specifically, a currently active grammar may be stored in memory and associated with a current dialog with the user. For instance, if the user is in a digit dialing dialog with the ASR system, then the grammar can include an unconstrained digit grammar including vocabulary like the digits Zero through Nine, Oh, Star, Cancel, Goodbye, and the like. The grammar can also include known confusable vocabulary such as Pound and Help, which are often confusable with one another. In another instance, if the user is in a nametag dialing dialog with the ASR system, then the grammar can include a plurality of nametags such as Home, Office, and the like, and ubiquitous commands like Help, Cancel, and the like. Again, the grammar can also include known confusable vocabulary such as, for example, Goodbye and one or more nametags such as Best Buy or Good Humor that are often confusable with Goodbye.

At step 320, it is determined whether a first-best hypothesis of N-best hypotheses is confusable with any vocabulary within a grammar. For example, the first-best hypothesis from step 315 can be compared to the rest of the vocabulary within the grammar of step 315. More particularly, the first-best hypothesis can be cross-referenced against a list of vocabulary that is known to be confusable. If the determination is affirmative, then the method proceeds to step 350, otherwise the method proceeds to step 325.

At step 325, if a first-best hypothesis is not determined to be confusable with any vocabulary within a grammar, then the first-best hypothesis is accepted as recognized speech corresponding to received input speech. For example, if it is determined in step 320 that the first-best hypothesis is not confusable with the second-best hypothesis, then the first-best hypothesis can be accepted as the recognized speech.

At step 330, recognized speech can be acted upon. For example, the post-processor 216 of the ASR system 210 can use the recognized speech from step 325 for any suitable purpose.

At step 335, it can be determined if a current ASR session has ended. A current ASR session can include just recognition of a current user utterance, word utterance, string of word utterances, or the like. If the step 335 determination is affirmative, then the method stops at step 340. But if not, then the method proceeds to step 345.

At step 345, an ASR system prepares to obtain speech again from a user. For example, the ASR system 210 can prepare to obtain a subsequent word following the most recently recognized speech. In another example, the ASR system 210 can prepare to obtain repeated speech from the user.

If, back at step 320, the first-best hypothesis is confusable with one or more other vocabularies, then the process moves to step 350 where at least one parameter value of the first-best hypothesis is compared to one or more threshold values. For example, if the first-best hypothesis from step 315 is determined at step 320 to be confusable with the second-best hypothesis from step 315, then a first confidence value of the first-best hypothesis can be compared to a first threshold value. In another example, if the first-best hypothesis is confusable with any other vocabulary within the grammar, then one or more additional parameter values of the first-best hypothesis can be compared to other threshold value(s). More particularly, if the first-best hypothesis is confusable with, for example, a third-best hypothesis, then a second confidence value of the first-best hypothesis can be compared to a second threshold value. For example, if a particular nametag is doubly confusable with the ubiquitous commands Goodbye and Help, then two different confidence values and threshold values can be used. In any case, each threshold value corresponds with an individual hypothesis that is confusable with the first-best hypothesis.

Moreover, according to an alternative embodiment, a plurality of threshold values can be used for a given hypothesis that is confusable with the first-best hypothesis, wherein the threshold values can vary depending on grammar used in the processing step 315. For example, a typically confusable ubiquitous command word like Goodbye can have one threshold value associated with it in a digit dialing grammar and a different threshold value associated with it in a nametag dialing grammar.

Furthermore, according to another alternative embodiment, a plurality of threshold values can be used for a given hypothesis that is confusable with the first-best hypothesis, wherein the threshold values can vary by user. For example, the command word Goodbye can have one threshold value associated with it for one user, and a different threshold value associated with it for a different user. In another example, an ASR system can experience difficulty in recognizing the digits Three and Five for certain groups of speakers, wherein the words are often misrecognized as Eight and Nine respectively. Thus, the digits Three and/or Five can have threshold values for a certain group(s) of speakers that are different for other group(s) of speakers.

If, at step 350, at least one parameter value of a first-best hypothesis is greater than at least one threshold value, then the first-best hypothesis is subsequently accepted at step 325 as recognized speech corresponding to the received input speech. For example, if the first confidence value of the first-best hypothesis is greater than the first threshold value, then the first-best hypothesis is accepted. If, however, at step 350, the parameter value(s) of the first-best hypothesis is not greater than the threshold value(s), then the method proceeds to step 355.

At step 355, it is determined whether a second-best hypothesis of N-best hypotheses is confusable with a first-best hypothesis. For example, when a user utters the word Pound, an ASR system will often yield a first-best hypothesis of Help and a second-best hypothesis of Pound. Thus, such known confusable vocabulary can be cross-referenced against one another in any suitable manner. If, at step 355, the second-best hypothesis is determined to be confusable with the first-best hypothesis, then according to one embodiment the method proceeds to step 360 and according to another embodiment the method proceeds instead to step 365. At step 360, and according to one embodiment, the second-best hypothesis is accepted as recognized speech corresponding to the received input speech, and the process continues as described above.

At step 365, and according to another embodiment, a parameter value of the second-best hypothesis can be compared to a lower threshold value and a higher threshold value. If, at step 365, the parameter value of the second-best hypothesis is determined to be within the range of values between the low and high threshold values, then the second-best hypothesis is accepted as corresponding to the input speech received from the user as shown at step 360.

Otherwise, as shown at step 370, the first-best hypothesis is set as the recognized result and, thereafter at step 375, a pardon message is transmitted to the user. The pardon message can be any suitable message. In a first example, and after a first loop from step 310 to step 375, the pardon message can include a request to the user to repeat the user's input speech wherein the method proceeds back to step 310 to receive the user's repeated speech. In a second example, and after one or more subsequent loops from step 310 to step 375, the pardon message can include a request to the user to confirm that the user's intended input speech is the first-best hypothesis. In such a case, and depending on the user's response, step 335 can be used to determine whether to prepare to receive a repeat of the user's intended input speech or to end the current recognition. Those skilled in the art will recognize that any suitable counters and flags may be incremented and set in order to count any desired number of loops through steps 310 to 375 before the user is queried to confirm the first-best hypothesis.

Referring again to step 355, if the second-best hypothesis is not determined to be confusable with the first-best hypothesis, then the method proceeds directly to step 370, wherein the method can proceed as described previously.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A speech recognition method comprising the steps of:
   (a) receiving input speech containing vocabulary via a microphone associated with an automatic speech recognition system;
   (b) processing the input speech with a grammar to obtain N-best hypotheses and associated parameter values using at least one processor associated with the automatic speech recognition system;
   (c) cross-referencing a first-best hypothesis of the N-best hypotheses against a list of known confusable vocabulary to determine whether the first-best hypothesis of the N-best hypotheses is confusable with any of the known confusable vocabulary;
   (d) accepting the first-best hypothesis as recognized speech corresponding to the received input speech, if the first-best hypothesis is not determined to be confusable with any of the known confusable vocabulary;
   (e) comparing at least one parameter value of the first-best hypothesis to at least one threshold value, if the first-best hypothesis is determined to be confusable with any of the known confusable vocabulary;
   (f) accepting the first-best hypothesis as recognized speech corresponding to the received input speech, if the at least one parameter value of the first- best hypothesis is greater than the at least one threshold value;
   (g) determining if a second-best hypothesis of the N-best hypotheses is confusable with the first-best hypothesis, if the at least one parameter value of the first-best hypothesis is not greater than the at least one threshold value;
   and (h) accepting the second-best hypothesis as recognized speech corresponding to the received input speech, if the second-best hypothesis is determined to be confusable with the first-best hypothesis;
   (h1) determining if a confidence score of the second-best hypothesis is between lower and upper threshold values;
   and (i) accepting the second-best hypothesis as recognized speech corresponding to the received input speech, if the confidence score is determined to be within the lower and upper threshold values.

2. The method of claim 1, further comprising the steps of:
   (i1) setting the first-best hypothesis as recognized speech corresponding to the received input speech, if the second-best hypothesis is not determined to be to be confusable with the first-best hypothesis.

3. The method of claim 2, further comprising the step of:
(i2) transmitting a pardon message after setting the first-best hypothesis as the recognized speech.

4. The method of claim 3, further comprising the steps of:
(i4) presenting the first-best hypothesis to a user for confirmation;
and (i5) accepting the first-best hypothesis as recognized speech corresponding to the received input speech, if the first-best hypothesis is confirmed by the user.

5. The method of claim 1, wherein the at least one threshold value includes a plurality of threshold values, each corresponding with an individual hypothesis that is confusable with the first-best hypothesis.

6. The method of claim 1, wherein the at least one threshold value includes threshold values for a given hypothesis that is confusable with the first-best hypothesis, wherein the threshold values vary depending on a grammar being used in the processing step.

7. The method of claim 1, wherein the at least one threshold value includes threshold values for a given hypothesis that is confusable with the first-best hypothesis, wherein the threshold values vary by user.

8. The method of claim 1, wherein the at least one parameter value is a confidence value.

9. A speech recognition method comprising the steps of:
(a) receiving input speech containing vocabulary via a microphone associated with an automatic speech recognition system;
(b) processing the input speech with a grammar to obtain N-best hypotheses and associated parameter values using at least one processor associated with the automatic speech recognition system;
(c) cross-referencing a first-best hypothesis of the N-best hypotheses against a list of known confusable vocabulary to determine whether the first-best hypothesis of the N-best hypotheses is confusable with any of the known confusable vocabulary;
(d) accepting the first-best hypothesis as recognized speech corresponding to the received input speech, if the first-best hypothesis is not determined to be confusable with any of the known confusable vocabulary;
(e) comparing at least one parameter value of the first-best hypothesis to at least one threshold value, if the first-best hypothesis is determined to be confusable with any of the known confusable vocabulary; and
(f) accepting the first-best hypothesis as recognized speech corresponding to the received input speech, if the at least one parameter value of the first-best hypothesis is greater than the at least one threshold value;
(g) determining if a second-best hypothesis of the N-best hypotheses is confusable with the first-best hypothesis, if the at least one parameter value of the first-best hypothesis is not greater than the at least one threshold value;
(h) determining if a confidence score of the second-best hypothesis is between lower and upper threshold values; and
(i) accepting the second-best hypothesis as recognized speech corresponding to the received input speech, if the confidence score is determined to be within the lower and upper threshold values.

10. The method of claim 9, further comprising the steps of:
(m1) setting the first-best hypothesis as recognized speech corresponding to the received input speech, if the confidence score is not determined to be within the lower and upper threshold values.

11. The method of claim 10, further comprising the step of:
(m2) transmitting a pardon message after setting the first-best hypothesis as recognized speech.

12. The method of claim 11, further comprising the steps of:
(m4) presenting the first-best hypothesis to a user for confirmation; and
(m5) accepting the first-best hypothesis as recognized speech corresponding to the received input speech, if the first-best hypothesis is confirmed by the user.

* * * * *